United States Patent [19]
Yokoyama

[11] Patent Number: 5,516,198
[45] Date of Patent: May 14, 1996

[54] RECLINING DEVICE FOR VEHICLE SEAT

[75] Inventor: Sho Yokoyama, Akishima, Japan

[73] Assignee: Tachi-S Co., Ltd., Tokyo, Japan

[21] Appl. No.: 313,806

[22] Filed: Sep. 28, 1994

[51] Int. Cl.⁶ ........................................ B60N 2/02
[52] U.S. Cl. .......................................... 297/362; 297/364
[58] Field of Search ................................. 297/363, 364, 297/365, 362

[56] References Cited

U.S. PATENT DOCUMENTS

| 4,770,464 | 9/1988 | Pipon et al. |  |
|---|---|---|---|
| 5,161,856 | 11/1992 | Nishino . |  |
| 5,234,255 | 8/1993 | Kawakita | 297/362 |

FOREIGN PATENT DOCUMENTS

| 0486758 | 5/1975 | Australia | 297/365 |
|---|---|---|---|
| 2348364 | 9/1973 | Germany | 297/365 |
| 3509855 | 10/1986 | Germany | 297/364 |
| 0636332 | 3/1962 | Italy | 297/365 |
| 57-134340 | 8/1982 | Japan . | |
| 61-100246 | 6/1986 | Japan . | |
| 61-193250 | 12/1986 | Japan . | |
| 62-75734 | 5/1987 | Japan . | |

*Primary Examiner*—Peter R. Brown
*Assistant Examiner*—Anthony D. Barfield
*Attorney, Agent, or Firm*—Browdy and Neimark

[57] ABSTRACT

A reclining device for vehicle seat, which is of such a structure wherein a main shaft is provided between a movable arm plate fixed to a seat back of the seat and a base plate fixed to a seat cushion fixed to a seat cushion of the seat, wherein a first lock gear element is defined in one of the arm and base plates, while a second lock gear element is slidably mounted on the main shaft for meshed engagement with or disengagement from the first lock gear element, and wherein an interlocking element is disposed along the main shaft between the arm and base plates, so as to permit such engagement and disengagement between the first and second lock gear elements to be effected by rotational operation of a lever. This makes the reclining device small in size and weight. The two gear elements may be formed generally annular for full meshed engagement therebetween, thereby making them rigid against deformation.

11 Claims, 4 Drawing Sheets

RECLINING DEVICE FOR VEHICLE SEAT

BACKGROUND OF INVENTION

1. Field of the Invention

The present invention relates to a reclining device for a vehicle seat such as an automotive seat.

2. Description of Prior Art

In a typical conventional reclining device used in a vehicle seat, a pair of lock gears are provided for their mutual meshed engagement to place the reclining device in a locked state, so that a seat back may be adjustably locked at a desired inclination angle relative to a seat cushion. The reclining device has an arm plate rotatably fixed to the seat back, which arm plate is provided with one of those two lock gears, and has an operation lever operatively connected to a lock plate provided with another of the same lock gears, as is known, for example, from the Japanese Laid-Open Patent Pub. No. 57-134340. Because of the two lock gears being in a partial mesh with each other, a weight of a passenger is directly exerted via the seat back upon the meshed part between the two lock gears, and therefore, both lock gears require a sufficient strength to resist such passenger's weight. This is an important issue calling for a high safety of vehicle or automobile, in view of an excessive load or passenger's weight tending to give an extraordinary impact to the seat back in such a case of a sudden acceleration or deceleration. Consequently, the teeth of the lock gear need to be formed more greatly in thickness than normally considered.

Such formation of lock gear inevitably results in increasing the dimensions of the lock gear per se, which means to make larger the whole body of reclining device, thus taking up much space for mounting the reclining device in the seat. Obviously, not only the outer aesthetic appearance of seat is impaired, but also is deteriorated the cushiony property of the seat. Further, the increase in thickness of each lock gear tooth results in giving a large pitch between one and another teeth, which undesirably increases the interval per degree a for reclining angle of the seat back relative to the seat cushion, leaving a problem with a fine adjustment of the reclining device.

SUMMARY OF THE INVENTION

In view of the above-stated drawbacks, it is a primary purpose of the present invention to provide an improved reclining device which is of a small, lightweight-oriented, structure.

To achieve such purpose, in accordance with the present invention, there is basically provided a reclining device for vehicle seat, comprising:

a movable plate means fixed to a seat back of the seat;

a base plate means fixed to a seat cushion of the seat;

a shaft means having one end connected rotatably to one of those movable and base plate means and having another end secured to another of the movable and base plate means;

the movable plate means being rotatable about the shaft means with respect to the base plate means;

a first lock gear means which is defined in one of those movable and base plate means at a point to which the foregoing one end of the shaft means is rotatably connected;

a second lock gear means movable in a direction along a longitudinal axis of the shaft means so as to be brought to a meshed engagement with or disengaged from the first lock gear means;

a biasing means for biasing the second lock gear means towards the first lock gear means, to thereby normally keep the meshed engagement between those two lock gear means;

a lever means;

an interlocking means provided between the second lock gear means and lever means, whereby operation of the lever means causes the second lock gear means to be moved along the longitudinal axis of the shaft means in a direction away from the first lock gear means, against a biasing force of the biasing means, thus disengaging the first lock gear means from the second lock gear means.

Accordingly, all the above-described elements are collectively mounted between the movable and base plate means, basically along the longitudinal axis of the shaft means, thus making small the whole size of the reclining device.

Preferably, the second lock gear means may be provided with a slider means for allowing sliding movement of the second lock gear means on the shaft means in a direction along the longitudinal axis thereof, and a rotation preventive means may be provided between the slider means and the shaft means so as to only permit such longitudinal sliding movement of the slider means along the shaft means, while preventing rotation of the slider means about the shaft means.

Preferably, the interlocking means may comprise: a first guide hole means operatively connected to a base end portion of the lever means, the first guide hole means being elongated in a generally vertical direction relative to the longitudinal axis of the shaft means and orienting slant in a direction away from a direction in which the second lock gear means is biased by the biasing means into the meshed engagement with the first lock gear means; a second guide hole means formed at the second lock gear means, the second guide hole means being disposed at a point aligned with the longitudinal axis of the shaft means; a third guide hole means formed at the shaft means, the third guide hole being elongated in a direction along the longitudinal axis of the shaft means; and a guide means which is inserted through all the first, second and third guide hole means, such that the guide means is slidably inserted through the first and third guide hole means, while being securely inserted in the second guide hole means, whereby vertically rotational operation of the lever means produces a horizontal or lateral displacement of the first guide hole means relative to a vertical rotational direction of the lever means, which in turn causes the second lock gear means to be moved via the guide means along the third guide hole means, against a biasing force of the biasing means, thereby disengaging the second lock gear means from the first lock gear means.

It is a second purpose of the present invention to make the first and second lock gear means more effective not only in strength against deformation but also in fine adjustment of the reclining angle.

To this end, in accordance with the present invention, preferably, both first and second lock gear means may be formed to generally assume an annular lock gear having many teeth formed around its whole peripheral end for a full mutual meshed engagement between the two lock gear means. Thus, a great impact applied to those lock gear means is dispersed and absorbed radially by the mutually meshed many teeth between the two lock gears, which also permits each of the teeth to be formed thinner to make smaller the pitch among the teeth, thereby making possible more fine adjustment of the reclining angle of the seat back relative to the seat cushion.

In one aspect of the invention, a lower end portion of the movable plate means may be formed arcuate along a circle whose center is located at a central axis of the shaft means, while an upper end portion of the base plate means be also arcuate along a same circle with that circle, so that both arcuate lower and upper end portions are juxtaposed together to form concentric circular ends relative to the center axis of the shaft means, and an outwardly projected housing may be formed in each of such two arcuate end portions concentric with the shaft means, so that the shaft means, second lock gear means, biasing means and interlocking means are accommodated in a spacing defined between the two housings, with such an arrangement that at least three rivet means are provided circumferentially of the two concentric circular ends of movable and base plate means, thereby securing the lower arcuate end portion of the movable plate means rotatably to the upper arcuate end portion of the base plate means. This effectively makes more compact and smaller the size of the reclining device.

The reclining device may be disposed in both sides of the vehicle seat, providing thus a pair of reclining devices, wherein a connecting wire is operatively extended between the two respective interlocking means of the paired reclining devices for a synchronized operation therebetween to effect the mesh engagement and disengagement of the second lock gear means with and from the first lock gear means in both of the paired reclining devices.

Other various features and advantages of the present invention will become apparent from reading of the description hereinafter, with reference to the drawings.

DETAILED DESCRIPTION OF PREFERRED EMBODIMENT OF THE INVENTION

Referring to FIGS. 1 through 4, there is illustrated one preferred embodiment of the present invention, i.e. a dual type of reclining device comprising a pair of reclining devices (10)(10').

Figure 1:
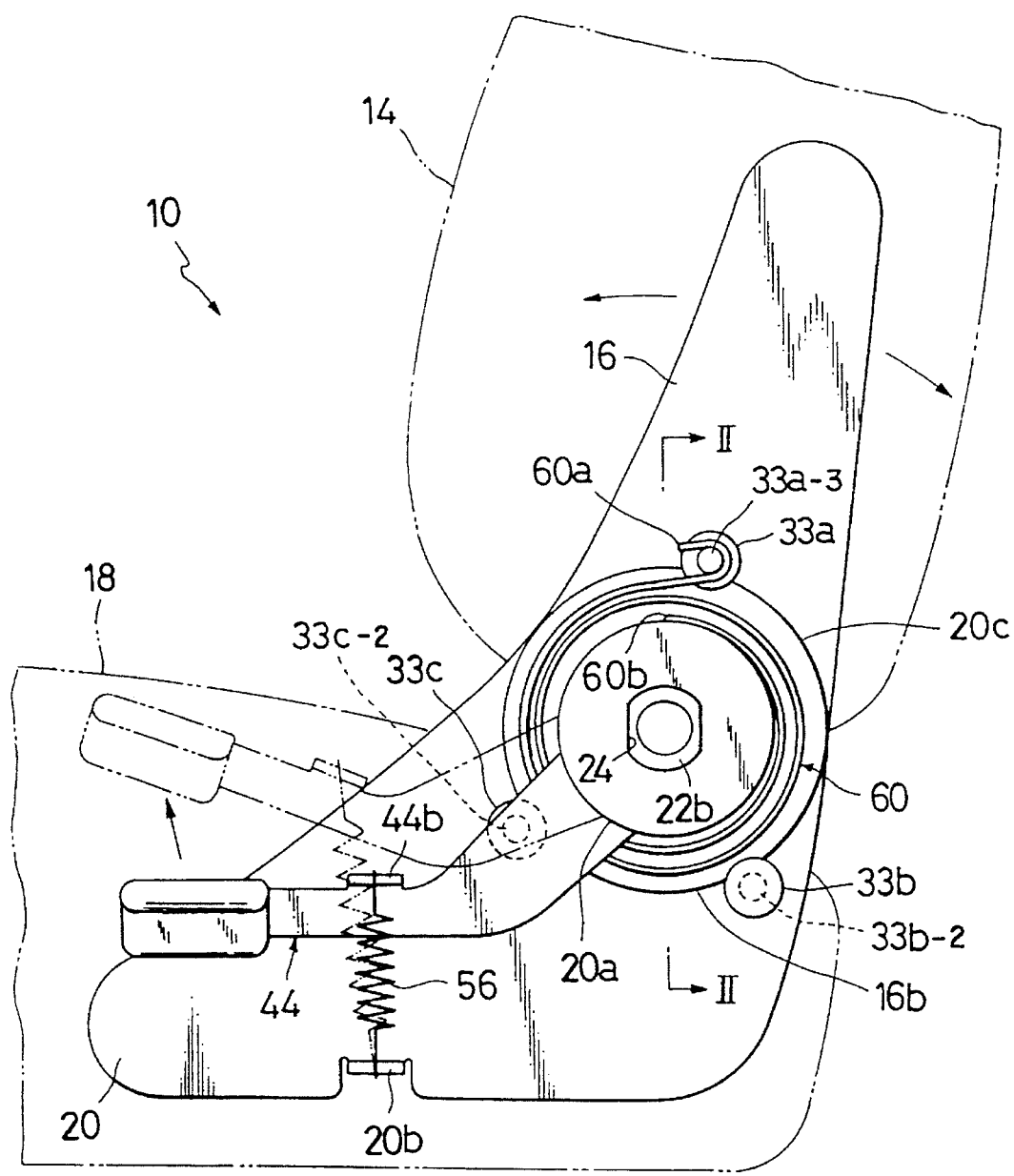
FIG. 1 is a schematic side view of a reclining device in accordance with the present invention.

In FIG. 1, generally designated by (10) is a left-side one of those paired reclining devices (as viewed from FIG. 2), which has a movable arm plate (16) fixed to one lateral wall of a seat back (14) and a stationary base plate (20) fixed to one lateral wall of a seat cushion (18). In brief, the arm plate (16) is rotatable about a main shaft (22) in the forward and backward direction with respect to the base plate (20).

Detailed description will be made of only such left-side reclining device (10) hereinafter, because of a substantially structural identity between the two reclining devices (10)(10'). But, some slight differences between them will be explained later.

Figure 2:
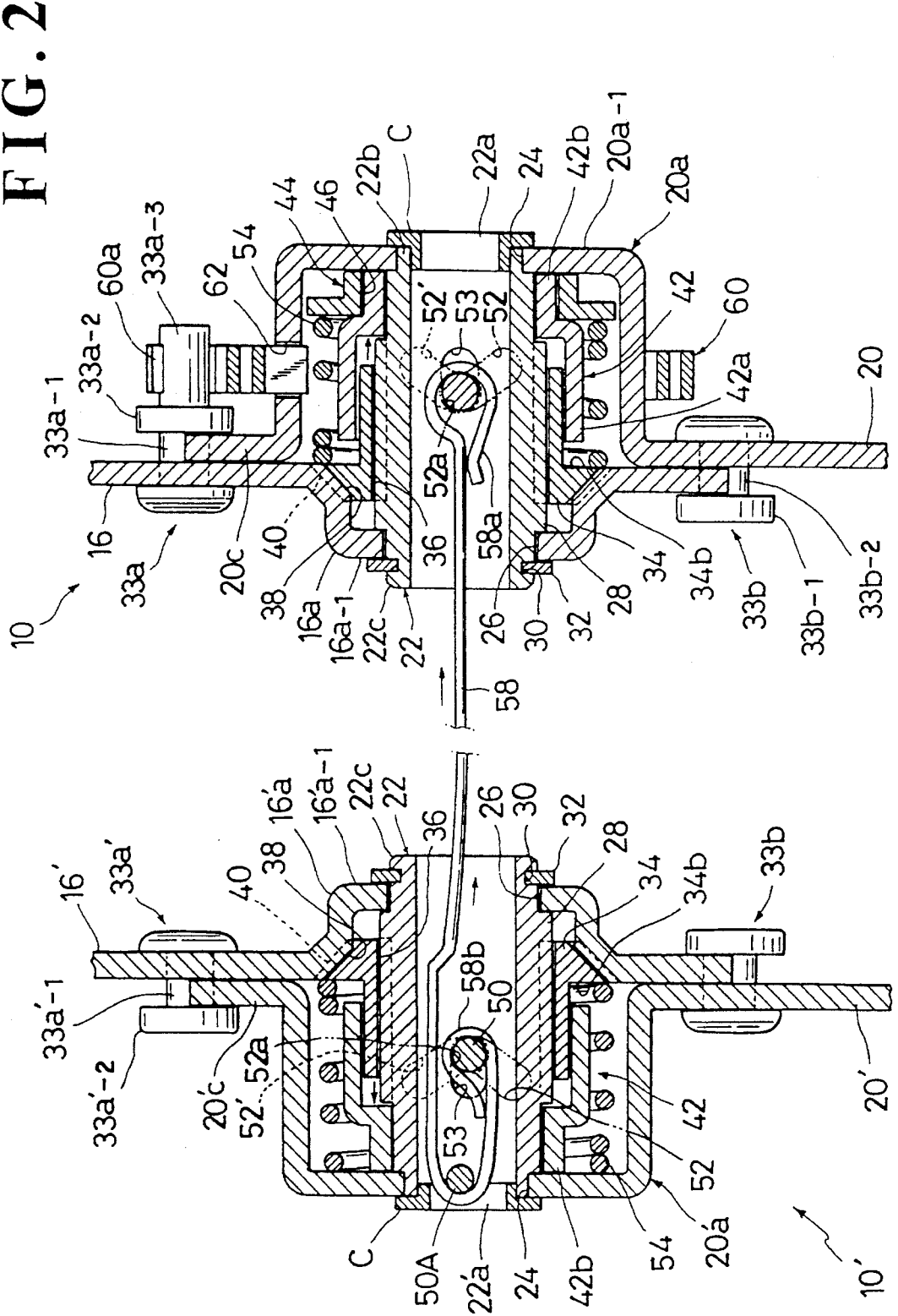
FIG. 2 is a schematic longitudinally sectional view of paired reclining devices, which shows the same to be in a locked state.
Figure 3:
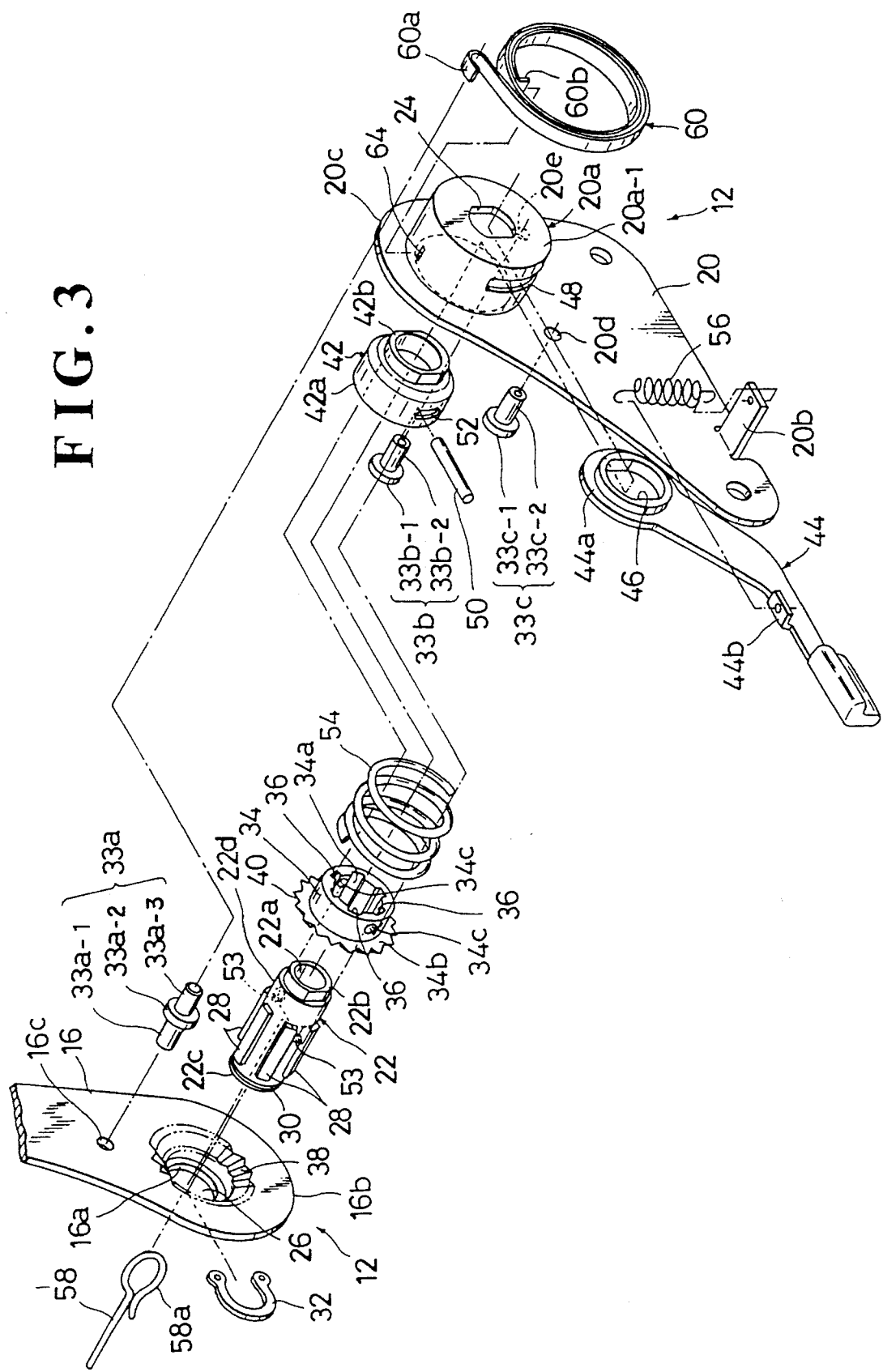
FIG. 3 is an exploded perspective view of one of the paired reclining devices shown in FIG. 2.

As understandable from FIGS. 1, 2 and 3, in the reclining device (10), the base lower portion of the arm plate (16) and the upper portion of the base plate (20) are respectively formed with arcuate edges (16b)(20c), each extending along a same circle and having a same center of the circle. Further, integrally formed in the respective centers of such base lower and upper portions of the arm and base plates (16)(20) are a first cylindrical housing (16a) and a second cylindrical housing (20a), each being opened inwardly and having outward wall (16a-1, 20a-1). In the outward wall (20a-1) of the second cylindrical housing (20a), a non-circular hole (24) is formed, whereas in the outward wall (16a-1) of the first cylindrical housing (16a), a circular hole (26) is formed, as best seen in FIG. 3, such that both holes (24)(26) are disposed cocentrically with respect to the center of a circle formed by the juxtaposition of the foregoing lower and upper arcuate edges (16b)(20c) respectively of the arm and base plates (16)(20).

As shown in FIGS. 2 and 3, the main shaft (22) is of a tubular configuration having a coaxially formed throughbore (22a). One end (22b) of the shaft (22) is of a non-circular cross-section generally corresponding to (but slightly smaller than) the non-circular hole (24) of the second cylindrical housing (20a), and secured therein against rotation. Also, such end (22b) is prevented against outward removal by means of a caulking (C). On the other hand, another end (22c) of the shaft (22), which has an annular groove (30) and a circular cross-section generally corresponding to the circular hole (26) of the first cylindrical housing (16), is rotatably fitted in that circular hole (26) and also prevented against outward removal by means of a C-shaped securing ring (32) being resiliently attached about the annular groove (30) (see FIG. 2). Hence, the arm plate (16) is free to rotate forwardly and backwardly with respect to the base plate (20) via the main shaft (22).

The main shaft (22) is formed, at the outer peripheral surface thereof, with equidistant six longitudinal guide protrusions (28) to be explained later, in an integral manner. Those six guide protrusions (28) are so formed in the shaft (22) that they are disposed equidistantly from each other at 60 degrees about the circumference of shaft (22) relative to the center thereof, and that each of them extends from the end (22c) to other end (22a) of the same shaft (22), terminating in a smooth circular surface area (22d) or what can be described as a lower offset area relative to the guide protrusions (28). As will be explained later, about such lower offset circular surface area (22d), the small-diameter securing part (42b) of a geared slider guide member (42) is rotatably fitted.

In addition to being connected together via the main shaft (22) as above, both arm and base plates (16)(20) are rotatably secured together by the three rivets (33a)(33b) (33c). Namely, the lower arcuate base end portion of the arm plate (16) is juxtaposed with the upper arcuate part of the base plate (20), forming thus a circle by their respective arcuate edges (16b)(20c), the circle having its center at the main shaft (22), as can be seen from FIG. 1. Therefore, one rivet hole (16c) is formed at one given point in the arm plate (16), which is located on the circumference of the foregoing circle, while two rivet holes (20d)(20e) are formed respectively at two given points in the base plate (20), which are also located on such circle's circumference. Hence, by inserting one rod portion (33a-1) of a rivet (33a) into the rivet hole (16c), the upper part of the arm plate (16) is rotatably supported via such rivet rod portion (33a-1) upon the upper arcuate edge (20c) of base plate (20), and also by inserting the respective rod portions (33b-2)(33c-2) of two rivets (33b) (33c) into each of the two rivet holes (20e)(20d), the lower arcuate edge (16b) of arm plate (16) is rotatably supported upon those two rivet rod portions (33b-2)(33c-2).

In that manner, while being rotatable about the main shaft (22), the arm plate (16) is retained at three points against wobbling relative to the base plate (20), (i.e. at the three rivets (33a)(33b)(33c)), insuring a stable fore-and-aft rotation of the arm plate (16) upon the base plate (20) in cooperation with the main shaft (22).

As best seen in FIG. 3, a frusto-conically-shaped inwardly toothed lock gear portion (38) is formed at the inward opened side of the first cylindrical housing (16a). On the other hand, a ringed slider (34) is formed at one end thereof with a frusto-conically-shaped outwardly toothed lock gear portion (40) to be meshed with that inwardly toothed lock gear portion (38). The ringed slider (34) has, formed in its inner peripheral surface, six equidistant recessed portions (36) into which the foregoing six guide protrusions (28) of main shaft (22) are to be slidably fitted, respectively. Thus, the ringed slider (34) with the outwardly toothed lock gear portion (40) is free to slide on and along the main shaft (22) only in the longitudinal direction thereof within the length of the six guide protrusions (28), while being surely prevented against rotation by such unidirectional slidable engagement between those six guide protrusions (28) and six recessed portions (28).

In FIG. 3, designated by (42) is a cylindrical slider guide member having a large cylindrical part (42a) and a small cylindrical part (42b) formed integrally together. As shown, the small cylindrical part (42b) of this slider guide member (42) has an inner circular opening into which the above-mentioned offset smooth surface area (22d) of main shaft (22) is inserted rotatably, and has an outer non-circular wall surrounding such inner circular opening (as seen in FIG. 3). The large cylindrical part (42a) of the slider guide member (42) is of such a dimensions that accommodates therein the ringed slider (34) fitted on the main shaft (22), excepting the outwardly toothed gear portion (40) thereof, and also allows for the longitudinal sliding motion of the ringed slider (34) on and along the shaft (22).

Designation (44) denotes an operation lever whose base end portion (44a) is formed with a non-circular connecting hole (46) identical in shape to but slightly larger than the above-stated outer non-circular wall of the slider guide member small cylindrical part (42b). As shown, the operation lever (44) is mounted laterally and outwardly of the base plate (20), such that the base end portion (44a) of the lever (44) is securely connected to the slider guide member (42) within the second cylindrical housing (20a) by fitting the small cylindrical part (42b) of the latter into the connecting hole (46) of the former, while the free end portion of the lever (44) opposite to that base end portion (44a) extends outwards from the housing (20a) through a slit (48) formed peripherally of the circular side wall of the same housing (20a). The free end portion of the operation lever (44) has a lug (44b) to which one end of a return spring (56) is secured. Another end of the return spring (56) is secured to an outwardly projected lug (20b) of the base plate (20). With this structure, the operation lever (44) is rotatable upwardly and downwardly about the main shaft (22) via the slider guide member (42) within the rotatable range limited by the slit (48) and normally biased in a downward direction, as indicated in FIG. 1.

As understandable from FIGS. 2 and 3, both ringed slider (34) and slider guide member (42) are collectively mounted on the main shaft (22) within the length of the latter shaft (22). In this connection, according to the present invention, there is provided an interlocking means for causing horizontal movement of the ringed slider (34) along the main shaft (22) by the foregoing vertical rotation of the operation lever (44) so as to bring the outwardly toothed gear portion (40) into a meshed engagement with the inwardly toothed gear portion (38) or release the same (40) from such meshed engagement therewith.

Figure 5:
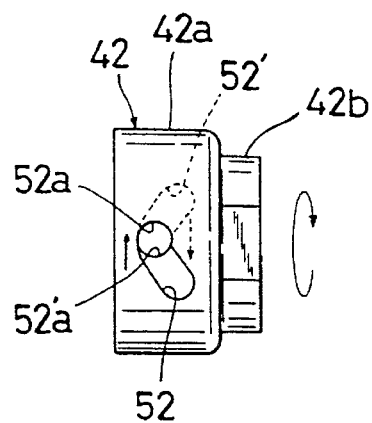
FIG. 5 is a side view of a slider guide member used in the reclining device.

In the embodiment shown in FIG. 3, such interlocking means is materialized by: a guide pin (50); a pair of first and second helical guide holes (52)(52') which are formed respectively in the opposite arcuate lateral walls of large cylindrical part (42a) of slider guide member (42), wherein as can be seen from both FIGS. 2 and 5, the first guide hole (52) extends slant towards the base plate (20) along one side of such lateral walls of large cylindrical part (42a), thereby assuming a certain helical guide hole in a vertically extending way relative to the horizontally extending central longitudinal axis of the slider guide member (42), orienting toward the base plate (20), and another second guide hole (52') defined opposite to the first guide hole (52) also extends slant towards the base plate (20) along another opposite side of the same arcuate lateral wall (42a), thereby assuming a helical guide hole in a symmetrical relationship with that of the first guide hole (52); a pair of securing circular holes (34c)(34c) which are respectively formed in the opposite walls of the ringed slider (34); a pair of longitudinally elongated guide holes (53)(53) which are formed respectively in the opposite walls of the main shaft (22), extending along the longitudinal axis of that shaft (22); and a compression spring (54).

The above-stated two opposingly faced helical guide holes (52)(52') are so arranged respectively on the opposite sides of slider guide member large cylindrical part (42a) that the upper rectilinear area (52a) of the first guide hole (52) should be set at an initial position on the same line with the longitudinal central axis of the main shaft (22), whereas the lower rectilinear area (52'a) of the second guide hole (52') should also be set at that initial position, with the guide pin (50) passing through those upper and lower rectilinear areas (52a)(52'a), as indicated in FIG. 2. As can be seen from FIGS. 2 and 3, the arrangement of those all elements is basically such that the guide pin (50) passes through the two longitudinally elongated guide holes (53)(53) as well as the two securing holes (34c)(34c), with both ends of the guide pin (50) fitted slidably in the two helical guide holes (52)(52') respectively, and that the compression spring (54) is sandwiched between the base end (44a) of operation lever (44) and the radially extending flange portion (34b) of ringed slider (34) to thereby bias the slider (34) per se toward the inwardly toothed lock gear portion (38), thus biasing the outwardly toothed lock gear portion (40) to mesh engagement with that inwardly toothed one (38).

Accordingly, the formation of this principal assembly is by firstly mounting the ringed slider (34) and slider guide member (42) about the main shaft (22) while insuring to align together all the foregoing three different shapes of holes (52, 52', 34c, 53), secondly inserting the guide pin (50) through those holes, then attaching the compression coil spring (54) about the thus-assembled ringed slider (34) and slider guide member (42), and sandwiching such assembled unit between the first and second cylindrical housings (16a)(20a) while fitting the operation lever securing hole (46) about the slider guide member small cylindrical part (42b).

In this assemblage, care must be taken to insure that the two helical guide holes (52)(52') are set in such an initial relative position that the upper rectilinear area (52a) of first guide hole (52) is aligned with the lower rectilinear area (52'a) of second guide hole (52'), as best seen from FIG. 5, and that the guide pin (50) passes through the thus-aligned upper and lower areas (52a)(52'a) of first and second guide holes (52)(52') and further, the guide pin (50) is located in the left-side ends of two longitudinally elongated holes (53)(53) formed in the main shaft (22), as shown in FIG. 2.

Hence, in the non-use state of the present reclining device (10, 10'), where the operation lever (44) is located in a non-use horizontal position as indicated by the solid line in FIG. 1, the two helical guide holes (52)(52') are so defined in the slider guide member (42) that the guide pin (50) is located and retained in both rectilinear areas (52a)(52'a) of the guide hole (52). As will be described later, to rotate the operation lever (44) upwardly as indicated by the two-dot chain line in FIG. 1 will cause relative transverse displacement of the two helical guide holes (52)(52') in the vertically circumferential direction of slider guide member (42), whereby the guide pin (50) is caused to be moved on a horizontal line along both longitudinally elongated guide holes in a direction toward the base plate (20).

Designation (60) denotes a spiral spring which is a conventional means for biasingly causing the arm plate (16) to be rotated forwardly with respect to the base plate (20); namely, as viewed from FIG. 1, the arm plate (20) is so biased by the spiral spring (60) as to tend to rotate anti-clockwise, thereby normally biasing the seat back (14) forwardly with respect to the seat cushion (18). One end (60a) of the spiral spring (60) is secured to another rod portion (33a-3) of the rivet (33a). Another end of the same spring (60) is secured in the slit (64) formed in the peripheral lateral wall of the second cylindrical housing (20a).

As shown in FIG. 2, a left-side reclining device (10') is identical in structure to the above-described right-side reclining device (10), excepting that the former (10') employs an ordinary rivet (33a') same with other ones (33b)(33c) and a second cylindrical housing (10') without such slits (62)(48) as found in the right-side reclining device (10) because of no provision of spiral spring (60) and operation lever (44). As illustrated, those structurally similar reclining devices (10)(10') are disposed spaced apart from each other in a symmetrical manner, with their respective first housings (16a)(16'a) facing toward each other inwardly of their respective base plates (20)(20') and with their respective second housings (20a)(20'a) facing outwardly thereof in a direction opposite to each other. In the present embodiment, a connecting wire (58) is extended between the two reclining devices (10)(10') in such a way that one end (58a) of the connecting wire (58) is fixed to the guide pin (50) in the right-side reclining device (10), whereas another end portion of the connecting wire (58) is slidably folded over a pin (50A) fast in a main shaft (22) of the left-side reclining device (10') and fixed to the guide pin (58) at another end (58b) thereof. This establishes an interlocking or synchronized operational relation between the two reclining devices (10)(10').

Now, the operation of the above-constructed reclining devices (10)(10') will be described.

Figure 4:
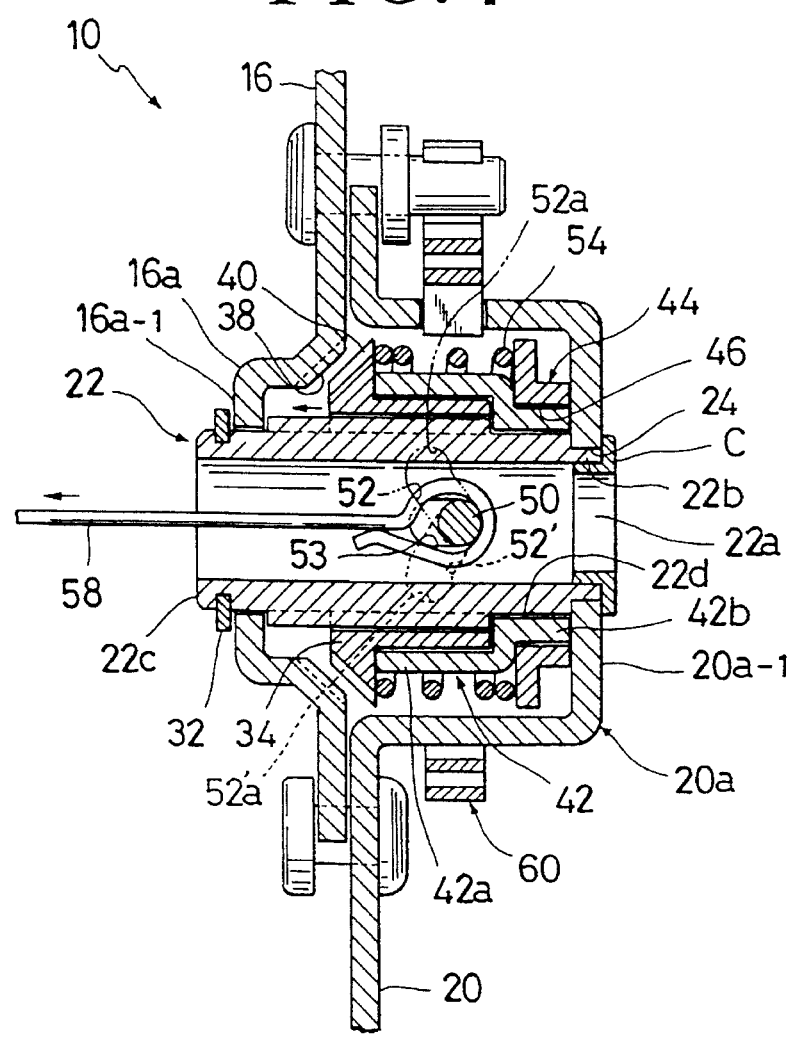
FIG. 4 is a schematic longitudinally sectional view of one of the paired reclining devices in FIG. 2, showing the same to be in an unlocked state.

Firstly, in view of the structural similarity between the two reclining devices (10)(10'), a description will be made only of the right-side reclining device (10) as viewed from FIG. 2, for the sake of simplicity. Of course, all like designations given in the right-side reclining device (10) correspond to all like designations given in the left-side reclining device (10'). When rotating upwardly the operation lever (44), i.e. in the clockwise direction as indicated by the two-dot chain line in FIG. 1, overcoming the force of return spring (56), the slider guide member (42) is rotated in the same clockwise direction, which causes the relative transverse displacement of two helical guide holes (52)(52') along the vertically circumferential direction of the slider guide member (42), as understandable from FIG. 5. By being so displaced, the two helical guide holes (52)(52'), due to their slant orientation crossing the vertical rotational direction of slider guide member (52), give a certain horizontal displacement amount to the guide pin (50) in a direction to the base plate (20), so that the guide pin (50) is displaced in the same horizontal direction relative to the vertical rotational direction of slide guide member (52). Indeed, the guide pin (50), which is supported in both ringed slider (34) and longitudinally elongated guide holes (53), is surely caused to be displaced on a horizontal line along the longitudinal axis of the main shaft (22) towards the base plate (20) or its housing (20a). Consequently, the ringed slider (34), which is only secured to the guide pin (50), is caused to be translated along both longitudinally elongated guide holes (53)(53) against the biasing force of compression spring (54), whereupon the outwardly toothed lock gear portion (40) integral with the ringed slider (34) is disengaged from the inwardly toothed lock gear portion (38) as shown in FIG. 4. It is observed here that, with the slider guide member (42) being rotated by the operation lever (44), the two helical guide holes (52)(52') are displaced toward each other in an intersecting way from their respective upper and lower end areas (52a)(52'a) towards their respective opposite ends, as understandable from FIGS. 2, 4 an 5, thereby cooperating with each other to cause such horizontal displacement of the guide pin (50).

Simultaneous with the above-described actions of the right-side reclining device (10), the connecting wire (58) is pulled by the thus-moved guide pin (50) towards the base plate (20), which in turn pulls another guide pin (50) of left-side reclining device (10') towards another base plate (20') thereof. Thus, in this particular reclining device (10'), such pulling force from the connecting wire (58) causes horizontal displacement of the pin (50) along the longitudinal axis of main shaft (22) to forcibly rotate the ringed slider (42) via two helical guide holes (50)(52') along the two longitudinally elongated guide holes (53)(53), so that the ringed slider (42) is moved towards the base plate (20'), thereby disengaging the outwardly toothed lock gear portion (40) from the inwardly toothed lock gear portion (38).

Accordingly, both reclining devices (10)(10') are placed in an unlocked state by the upward rotation of the operation lever (44), during which, both two arm plates (16)(16') are being free to rotate, permitting a passenger on the seat to adjust the inclination of the seat back (14) with respect to the seat cushion (18). The passenger can release the operation lever (44), when he or she determines a desired seat back inclination angle, so that both two outwardly toothed gear portions (40)(40) are brought by the biasing forces of return and compression springs (56) (54) back to engagement with their mating inwardly toothed gear portions (38)(38). In this way, the inclination angle of the seat back (14) may be adjusted and set at a desired angle through operation of the reclining devices (10)(10').

In accordance with the present invention, therefore, the following advantages are given:

(1) All the movable principal elements (22, 34, 38, 40, 42) are collectively mounted within a small space between the two cylindrical housings (16a)(20a), which realizes a thin structure of reclining device and does not impair the cushiony effect and outer aesthetic appearance of the seat which is found in the prior art.

(2) A great force produced in a collision case, which is imparted to the reclining devices (10)(10'), is dispersed and absorbed equally by the whole radially rowed plural teeth of outwardly and inwardly toothed lock gear portions (40)(38), thereby effectively reducing an impact of the great force and protecting those gear portions (40)(38) against deformation and breakage. This also permits a more thin formation of each tooth of those lock gear portions (40)(38), making thus it possible to design much smaller pitches among the teeth of the same gear portions and attain a more fine adjustment in reclining angle of the seat back (14) relative to the seat cushion (18).

(3) The ringed slider (34) may be moved along the central longitudinal axis of the main shaft (22) by the rotation of the operation lever (44) through an interlocking means employing the combination of vertically helical guide hole (52) and longitudinally elongated hole (53) so as to effect mesh engagement or disengagement between the outwardly and inwardly toothed lock gear portions (40)(38). This greatly simplifies the locking structure and mechanism of reclining device (10 or 10').

While having described the present invention thus far, it should be understood that the invention is not limited to the illustrated embodiment, but other various modifications, replacements and additions may be applied thereto structurally without departing from the scopes of the appended claims. For example, the outwardly and inwardly toothed lock gear portions (40)(38) may be formed in a flat annular shape, respectively, in the flange part (34b) of ringed slider (34) and in the coplanar inward surface of arm plate (16), instead of such frusto-conical shape. The main shaft (22) may be secured to the arm plate (16) and those two male and female lock gear portions (40)(38) be defined between the slider (34) and base plate (20), in place of the illustrated embodiment. The reclining device may be applied to other sorts of seat than the vehicle seat, such as the one used in a train, airplane, or ships.

What is claimed is:

1. A reclining device engaged on a vehicle seat, the vehicle seat having a seat back and a seat cushion, the seat back adjustably inclinable by the reclining device with respect to the seat cushion, said reclining device comprising:

a movable plate means fixed to said seat back;

a base plate means fixed to said seat cushion;

a shaft means having a first end connected rotatably to either said movable plate means or said base plate means and a second end secured to the other of said movable plate means or said base plate means;

said movable plate means being rotatable about said shaft means with respect to said base plate means;

a first lock gear means in either said movable plate means or said base plate means at a point to which said first end of said shaft means is rotatably connected;

a second lock gear means which is slidably fitted about said shaft means such as to be slidingly movable in a longitudinal direction of said shaft means and thereby be brought to a meshed engagement with or disengaged from said first lock gear means;

both said first lock gear means and second lock gear means being interposed between said movable and base plate means;

an elastic biasing means disposed between said second lock gear means and one of said movable plate means on said base plate means, said elastic biasing means being for biasing said second lock gear means towards said first lock gear means, to thereby normally keep the meshed engagement therebetween;

a lever means;

an interlocking means provided between said second lock gear means and said lever means, said interlocking means including:

(a) a slide guide means which is so disposed between said movable plate means and said base plate means as to be rotatable relative to a central axis of said shaft means, said slide guide means being connected to a base end portion of said lever means, said slide guide means being formed with a first helical guide hole and a second helical guide hole at opposite sides of said slide guide means, said first helical guide hole having one end area from which other remaining area of the first guide hole extends helically along a peripheral wall of said slide guide means, whereas said second helical guide hole has one end area disposed in alignment with said one end area of said first helical guide hole, other remaining area of said second guide hole extending helically in an opposite direction to said other remaining area of said first guide hole, along a peripheral wall of said slide guide means, said other remaining area of each said first guide hole and second guide hole being oriented in a same direction away from said direction in which said second lock gear means is biased to the meshed engagement with said first lock gear means;

(b) a slider means integral with said second gear means, said slide means being slidably fitted about said shaft means and having a securing hole perforated therein;

(c) a pair of elongated guide holes which are formed on opposite sides of said shaft means, said pair of elongated guide holes extending along the longitudinal direction of the shaft means; and (d) a guide means which is inserted through said first helical guide hole, said second helical guide hole, securing hole and pair of elongated guide holes, wherein a vertically rotational operation of said lever means produces a horizontal or lateral displacement of said second gear means, against a biasing force of said elastic biasing means, in a direction to be disengaged from said first gear means.

2. The reclining device as defined in claim 1, wherein said point to which said first end of said shaft means is rotatably connected, is a hole formed in a lower end portion of said either said movable plate means or said base plate means, in which hole said first end of said shaft means is rotatably secured, wherein said first lock gear means is formed adjacently around said hole to generally assume a first annular lock gear portion, and wherein said second lock gear means is also formed in the same annular shape to permit the meshed engagement thereof with the first annular lock gear portion.

3. The reclining device as defined in claim 2, wherein said first annular lock gear portion is so tapered as to assume a generally frusto-conically recessed gear configuration around said hole, and wherein said annular second lock gear means is also so tapered as to assume a generally frusto-conically projected gear configuration for permitting the meshed engagement thereof with the frusto-conically recessed first annular lock gear portion.

4. The reclining device as defined in claim 1, wherein a rotation preventive means is provided between said slider means and said shaft means so as to only permit such longitudinal sliding movement of said slider means along said shaft means, while preventing rotation of said slider means about said shaft means, to thereby insure such unidirectional movement of said second lock gear means along the longitudinal axis of said shaft means.

5. The reclining device as defined in claim 4, wherein said slider means comprises a ringed slider, wherein said second lock gear means is integrally formed on an outer peripheral wall of said ringed slider, and wherein said rotation preventive means comprises a plurality of spaced-apart longitudinal protrusions which are formed on the outer peripheral wall of said shaft means in the longitudinal direction thereof and a plurality of spaced-apart longitudinal recessed portions which are formed in the inner peripheral wall of said ringed slider in the longitudinal direction thereof, with such an arrangement that said ringed slider is slidably fitted on said shaft means, with said longitudinal protrusions being in mesh with said longitudinal recessed portions, respectively.

6. The reclining device as defined in claim 1, wherein said slider means comprises a cylindrical slider guide member, wherein said cylindrical slider guide member includes a large cylindrical part and a small cylindrical part, wherein the first helical guide hole and second helical guide hole are respectively defined on opposite sides of said large cylindrical part of said slider member, wherein said small cylindrical part of said slide member is rotatably fitted about said shaft means, and wherein the base end portion of said lever means is firmly secured to said small cylindrical part of said slider member.

7. The reclining device as defined in claim 6, wherein said large cylindrical part of said slider guide member overlaps a part of said shaft means and most of said slider means of said second lock gear means, and wherein said compression spring is wound around said slider guider member between said second gear means and base plate means.

8. The reclining device as defined in claim 6, wherein said guide means comprises a guide pin longer than a diameter of said large cylindrical part of said slider member, and wherein said lever means comprises an operation lever which is normally biased by a return spring towards a non-use position.

9. The reclining device as defined in claim 1, wherein a lower end portion of said movable plate means is formed arcuate along a circle whose center is located at a central axis of said shaft means, and an upper end portion of said base plate means is also arcuate along a same circle with said circle, so that both arcuate lower and upper portions of said movable and base plate means are juxtaposed together to form concentric circular ends relative to the center axis of said shaft means, wherein said lower end portion of said movable plate means is formed with an outwardly projected first housing concentric with the thus-formed circular ends, and likewise, the upper end portion of said base plate is formed with an outwardly projected second housing concentric with the thus-formed circular ends, wherein said shaft means, second lock gear means, biasing means and interlocking means are accommodated in a spacing defined between said first and second housings, and wherein at least three rivet means are provided at a circumference of said concentric circular ends defined by the thus-juxtaposed lower and upper arcuate end portions respectively of said movable and base plate means, whereupon said movable plate means lower arcuate end portion is rotatably secured by said at least three rivet means to said base plate means upper arcuate end portion.

10. The reclining device as defined in claim 1, wherein said reclining device is disposed in both sides of said vehicle seat, providing thus a pair of reclining devices, and wherein a connecting wire is extended between said pair of reclining devices in such a manner that said connecting wire is operatively extended between the two respective interlocking means of said pair of reclining devices for a synchronized operation therebetween to effect said meshed engagement and disengagement of the second lock gear means with and from the first lock gear means in both of said paired reclining devices.

11. The reclining device as defined in claim 1, wherein said movable plate means has a first outwardly projecting housing and said base plate means has a second outwardly projecting housing, said first lock means, said second lock means, said elastic biasing means and said interlocking means each being disposed in a space defined between said first outwardly projecting housing and said second outwardly projecting housing.

* * * * *